Oct. 11, 1966  T. O. McCARTNEY  3,277,821
STAMP DEVICE
Filed July 24, 1964  4 Sheets-Sheet 1

INVENTOR.
TERRENCE O. McCARTNEY
BY
Jeare, Fetzer & Jeare
ATTORNEYS

Oct. 11, 1966  T. O. McCARTNEY  3,277,821
STAMP DEVICE

Filed July 24, 1964  4 Sheets-Sheet 2

INVENTOR.
TERRENCE O. McCARTNEY
BY
Jeare, Getzer & Jeare
ATTORNEYS

Oct. 11, 1966 T. O. McCARTNEY 3,277,821
STAMP DEVICE
Filed July 24, 1964 4 Sheets-Sheet 4

INVENTOR.
TERRENCE O. McCARTNEY
BY
Jeane, Fetzer & Jeane
ATTORNEYS

United States Patent Office 3,277,821
Patented Oct. 11, 1966

3,277,821
STAMP DEVICE
Terrence O. McCartney, 12896 Chillicothe Road,
Chesterland, Ohio
Filed July 24, 1964, Ser. No. 384,954
6 Claims. (Cl. 101—201)

This invention relates to the art of multi-color reproduction, and more particularly to an improved stamp device for the multi-color reproduction of different patterns, designs or other art works on paper, fiber, metal or other surfaces capable of receiving such reproduction.

The invention herein disclosed contemplates a device which incorporates an improved construction of a selectively adjustable printing surface which carries thereon a reproduction of a pattern or design, which when inked with any color or combination of colors automatically transfers the multi-color reproduction to a surface to be printed. The selectively adjustable construction of the printing surface enables a multitude of different combinations comprising a colored as well as colorless ink materials to reproduce any number of times any particular pattern or design within the dimensional limitations of the printing surface. Accordingly, an object of the present invention is to provide a highly economic and improved construction of a printing surface for the multi-color reproduction of a design, pattern, or work of art.

Another object of the present invention is to provide an improved stamp device of simple, yet rugged construction which incorporates a selectively adjustable printing surface that is capable of being embellished with any combination of colors for transferring a multi-color reproduction to a surface.

Another object of the present invention is to provide a self-contained stamp device which incorporates therein a plurality of ink storing elements which are adapted to be assembled and removed therefrom for automatically and selectively adjusting the printing surface, the elements themselves being utilized to apply any combination of colors to the selectively adjusted printing surface for multi-color reproduction.

A further object of the present invention is to provide an improved stamp device of the character described which incorporates an improved construction to provide quick and easy interchangeability of a legend card, which provides and facilitates a "full vision" of the legend to be reproduced, and which prevents accidental or inadvertent inversion of the legend to be reproduced.

Further objects and advantages, and other new and useful features in the construction, arrangement and general combination of elements of the improved stamp device of the present invention will be apparent to those skilled in the art as the following description proceeds with reference to the accompanying drawings, for purposes of illustration, but not of limitation, in which like reference characters designate like parts throughout, wherein.

Figure 1:
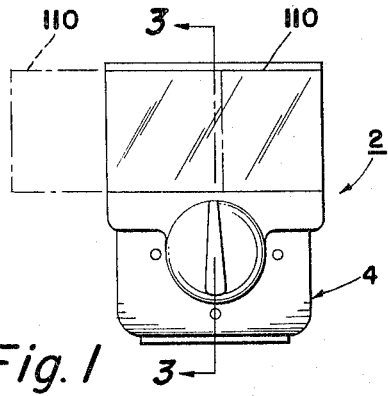
FIG. 1 is a front elevational view illustrating the improved stamp device made in accordance with the present invention.
Figure 2:
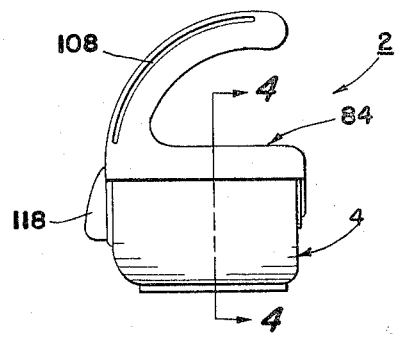
FIG. 2 is a side elevational view of the stamp device of FIG. 1.
Figures 3, 4:
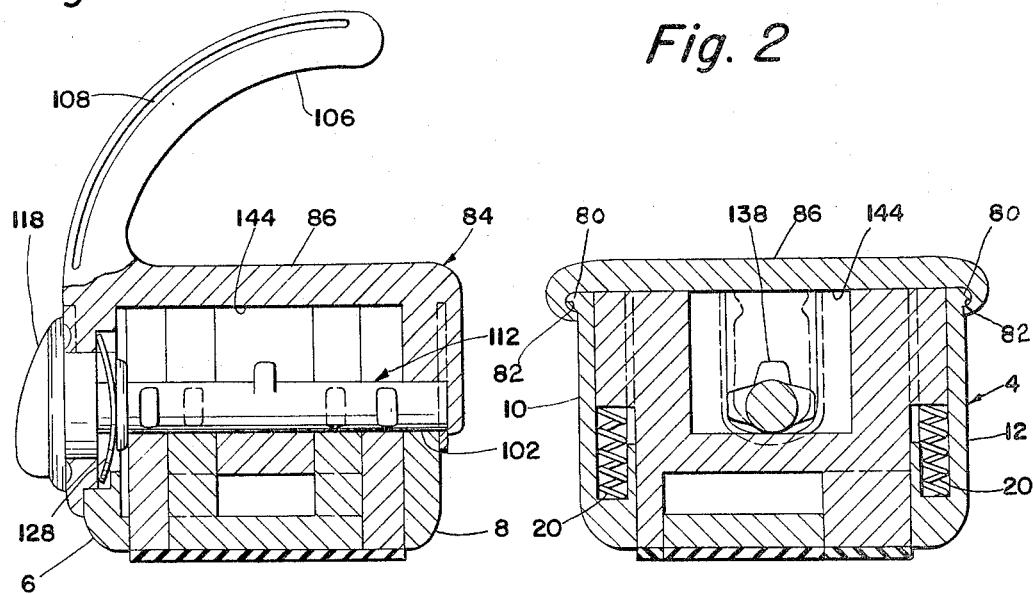
FIG. 3 is a vertical sectional view on an enlarged scale taken along the plane indicated by the line 3—3 of FIG. 1.
FIG. 4 is a vertical sectional view on an enlarged scale taken along the plane indicated by the line 4—4 of FIG. 2.

Briefly, the present invention, in one embodiment, provides an improved stamp device for multi-color reproduction which comprises a housing which is open at the top and bottom, a plurality of pressure applying members, each of which includes an impression element, disposed for movement within the housing, and which, together, in the printing position, define a printing surface for multi-color reproduction. The housing further includes a selectively adjustable cam means for individual camming coaction with the selective of the pressure applying members for alternately moving certain of the impression elements out of the printing surface into inking position for application thereto of various color inks, and for moving others of the impression elements out of the printing surface for application of other color inks and for automatically moving the ink impression elements back into the printing surface in a position ready for printing the multicolor reproduction.

In another embodiment, the stamp device is of a self-contained construction wherein the housing is provided with an upper and lower cavity and includes an impressionable portion adjacent the lower end thereof defining a printing surface. A drawer means is disposed for sliding movement into and out of each of the cavities which includes an absorbent member for storing thereon a particular color ink. A pressure applying member mounting an impression element is disposed for movement within the housing and a resilient means is pivotally mounted at one end within the housing and is operably connected at its other end to the pressure applying member for moving the impression element out of the printing surface into inking position and back into the printing surface upon movement of one of the drawer members for application of one color ink thereto; and for moving the impression element out of and back into the printing surface upon movement of the other drawer member for inking the impressionable portion of the housing for multi-color reproduction.

In either embodiment, the housing is preferably provided with an integral or removable handle construction which projects at a predetermined angle upwardly from the housing to facilitate manual manipulation of the stamp device for multi-color reproduction. The handle is preferably made from a transparent polymeric material and includes a thin, complementary shaped slot to receive and present a "full vision" of a legend card to be removably inserted therein.

Referring now again to the drawings and in particular to FIGS. 1 to 12 thereof, there is illustrated one embodiment of the stamp device, designated generally at 2. In the embodiment shown, the stamp device includes a generally polygonal, such as rectangular, housing 4 which is open at both the top and bottom and which includes upstanding front 6 and end 8 walls interconnected by side walls 10 and 12. The front 6 and end 8 walls, respectively, are preferably provided with generally U-shaped slots 14 and 16 disposed in axial alignment with one another. The side walls 10 and 12, respectively, are each provided with a plurality of spaced, oppositely disposed vertically extending key-way cylinders 18. The cylinders 18, in the embodiment shown, are preferably circular in cross-section, and open throughout a portion of their circumference onto the interior surface of the associated side walls. The cylinders 18 are preferably of a dimension to accommodate a plurality of coiled tension spring elements 20 (FIGS. 4 and 12) which are adapted to be disposed coaxially therein. The housing 4 may be made of any suitable polymeric material, such as clear or tinted plastic, which can be easily molded or suitably formed from other such transforming techniques, as are known in the art.

Figure 5:
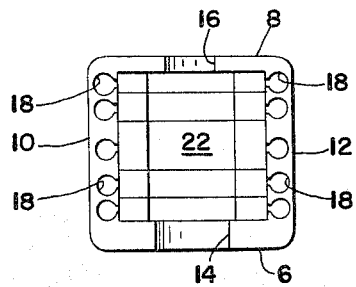
FIG. 5 is a top plan view with parts removed and illustrating the printer assembly positioned within the housing of the stamp device.
Figure 6:
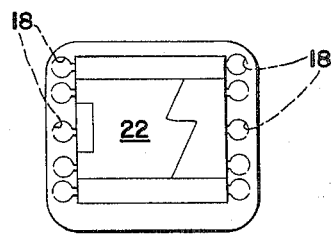
FIG. 6 is a bottom view of the housing and printer assembly of FIG. 5.
Figure 7:
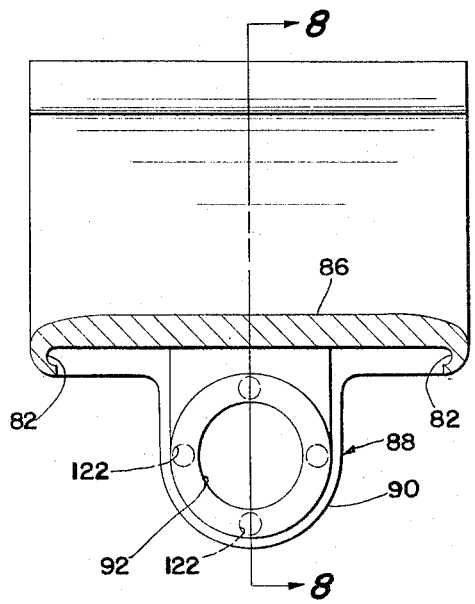
FIG. 7 is an enlarged front elevational view partly in section and showing the cover and associated handle removed from the assembly.
Figure 8:
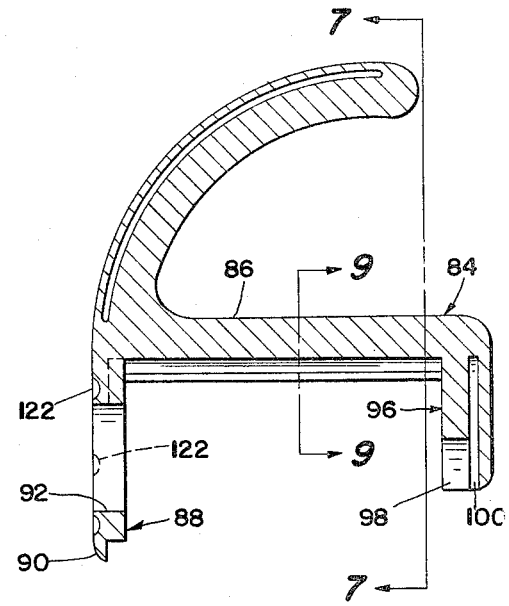
FIG. 8 is a vertical sectional view taken along the plane indicated by the line 8—8 of FIG. 7.
Figure 9:
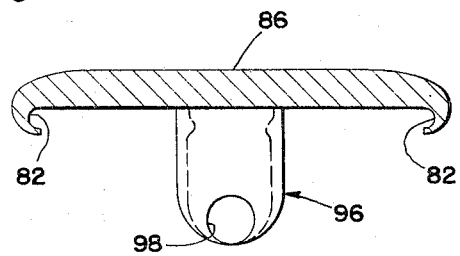
FIG. 9 is a vertical sectional view taken along the plane indicated by the line 9—9 of FIG. 8.

The housing 4 is preferably of a transverse dimension to accommodate therein a printer assembly of interchangeable block-like construction, designated generally at 22 of FIGS. 5 and 6. As best shown in FIGS. 3 to 6, and in the exploded view of FIG. 12, the printer assembly 22, in the embodiment shown, is preferably of a four part construction including a pair of first 24 and second 26 outer pressure blocks and third 28 and fourth 30 inner pressure blocks. The outer pressure blocks 24 and 26 are preferably of identical construction, each of which includes a polygonal body 32 and 34, such as rectangular shaped, which is cut out adjacent the upper end thereof to define axially aligned, generally planar cam follower surfaces 36 and 38 in the assembled position of the outer blocks. The outer blocks are each provided with a pair of integral, generally cylindrical key-way members 40 and 42 extending vertically adjacent opposed ends thereof and adapted to be slidable, yet tightly disposed within associated of the key-way cylinders 18 and in resiliently coacting engagement upon associated of the coil spring elements 20. The outer pressure blocks are each provided adjacent their lower ends with removable or integral stamp elements 44 and 46 which may be formed on their under surface with any desired pattern or design for use in duplicating the same upon any suitable surface or material after the stamp elements have been inked, as will hereinafter be more fully described.

The inner pressure block 28 includes a generally U-shaped body 48 defined by a pair of spaced, oppositely disposed generally L-shaped, in side elevation, side members 50 and 52 which are cut out adjacent their upper ends to define axially aligned, generally planar cam follower surfaces 54 and 56. A pair of generally cylindrical key-way members 58 and 60 are made integral with and extend vertically adjacent opposed ends of each of the respective side members 50 and 52 and adapted to be received in resilient coacting engagement within associated of the key-way cylinders 18 provided in the housing 4, as aforesaid. The pressure block 28 is similarly provided with a removable or integral stamp element 62 adjacent the lower end thereof for lubricating any desired pattern or design.

The other inner pressure block 30 includes a generally I-shaped, in side elevation, body 64 having a transversely extending base member 66 adjacent one end thereof. The I-shaped body 64 is cut out adjacent its upper end to provide a generally planar cam follower surface 68 and is cut out adjacent its lower end to provide a generally polygonal slot 70 so that it may be interlocked with the aforementioned inner pressure block 28. The body 64 is preferably of a transverse dimension so as to be slidably, yet tightly disposed in interlocking engagement intermediate the side members 50 and 52 of the aforementioned inner pressure block 28 with the base member 66 disposed in underlying relationship with respect to the side members in the assembled position of the printer assembly. The pressure block 30 is similarly provided with an oppositely disposed pair of vertically extending cylindrical key-way members 72 adapted for resilient coacting engagement within associated of the key-way cylinders 18 provided in the housing 4. In this instance, however, the body 64 is provided with a pair of spaced stamped elements 76 and 78 removably or integrally attached adjacent the lower ends thereof to simulate any pattern or design, as aforementioned.

The side walls 14 and 12 of the housing 4 are each provided adjacent the upper marginal end thereof with a longitudinally extending generally arcuate, in cross-section, guide ribs 80 (FIG. 4) having a transverse dimension to be slidably, yet tightly received within correspondingly shaped longitudinally extending channels or kerfs 82 provided in a removable cover, designated generally at 84. The cover 84 in the embodiment shown, includes a substantially planar base 86 of generally polygonal, such as rectangular, configuration which is complemental to and adapted to be slidably seated on the upper marginal edges of the front 6, end 8, and side walls 10 and 12 of the housing. The base 86 is provided adjacent one end with a depending, generally U-shaped front hanger member 88 (FIGS. 7 and 8) having a complementary shaped flange 90 adapted to be seated within the complementary shaped slot 14 provided in the front wall 6 of the housing 4. The hanger member 88 is preferably provided with a generally circular bearing opening 92 adapted to journal therein one end of a cam member 94.

The base 86 is provided adjacent its other end with another depending rear hanger member 96 having a similar circular bearing opening 98 disposed concentrically relative to the first mentioned bearing opening 92 and adapted to journal therein the other end of the cam member 94. The rear hanger member 96 is preferably provided with a generally U-shaped retainer groove 100 adapted to receive therein a complementary U-shaped, resilient retainer clip 102 (FIG. 12) having oppositely disposed projecting portions 104 for engageably retaining cover assembly 84 in position with housing 4.

As best shown in FIGS. 1 to 3, and 12, the cover 84 is provided adjacent its front end with a gripping handle 106 which is made integral with and which projects angularly upwardly from the base 86. In the embodiment shown, the handle is preferably curved symmetrically at an angle of approximately 45° relative to the base 86 and is provided with a thin, transverse legend receiving slot 108 which is open at both ends and which is formed to substantially the same 45° contour as the handle proper to provide a "full vision" of a legend card 110 to be inserted therein. This legend card may be made of any suitable material, such as paper, cardboard or the like, and may be provided with suitable indicia corresponding to the pattern or design to be duplicated by the stamp device. The handle proper may be made of any polymeric material, preferably of clear plastic, to simulate a transparent window, thereby to facilitate observation of the legend card. By such arrangement, the appropriate legend may be quickly assembled or removed from the handle, and when assembled therewith, presents a full view of the entire legend so as to prevent inadvertent inversion in normal usage thereof.

Figure 10:
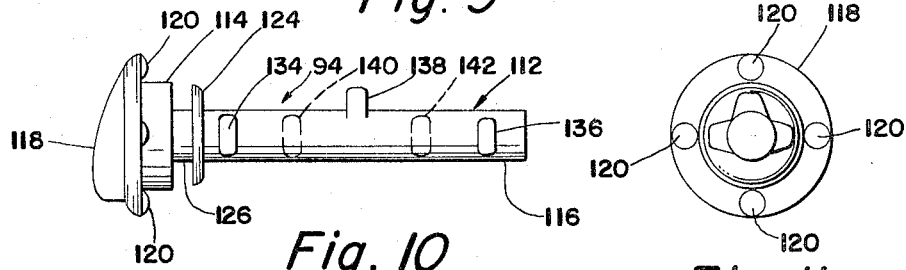
FIG. 10 is an enlarged elevational view of the cam shaft for actuating the printer assembly of the stamp device, and shown removed from the assembly.
Figure 11:
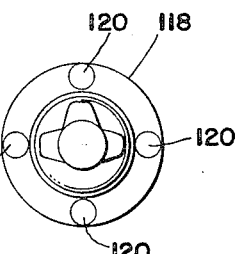
FIG. 11 is a side view looking from the right hand side of FIG. 10.

The cam member hereinbefore referred to generally at 94, includes an elongated, cylindrical shaft 112 provided adjacent its front end with an annular journal sleeve 114 and adjacent its rear end with an annular journal surface 116 (FIG. 10). A turning dial 118, in the embodiment shown, is made integral with the journal sleeve 114 and is provided on its inner face with four quarterly spaced detents 120 which are adapted to be selectively recessed into complementary indents 122 provided on the outer face of the front hanger member 88 for maintaining the shaft 112 in various locked positions upon turning of the dial. A collar 124 is mounted in axial spaced relation on the shaft 112 to provide an annular retainer groove 126 adapted to receive a resilient retainer disc 128 (FIG. 12) therein.

Figure 12:
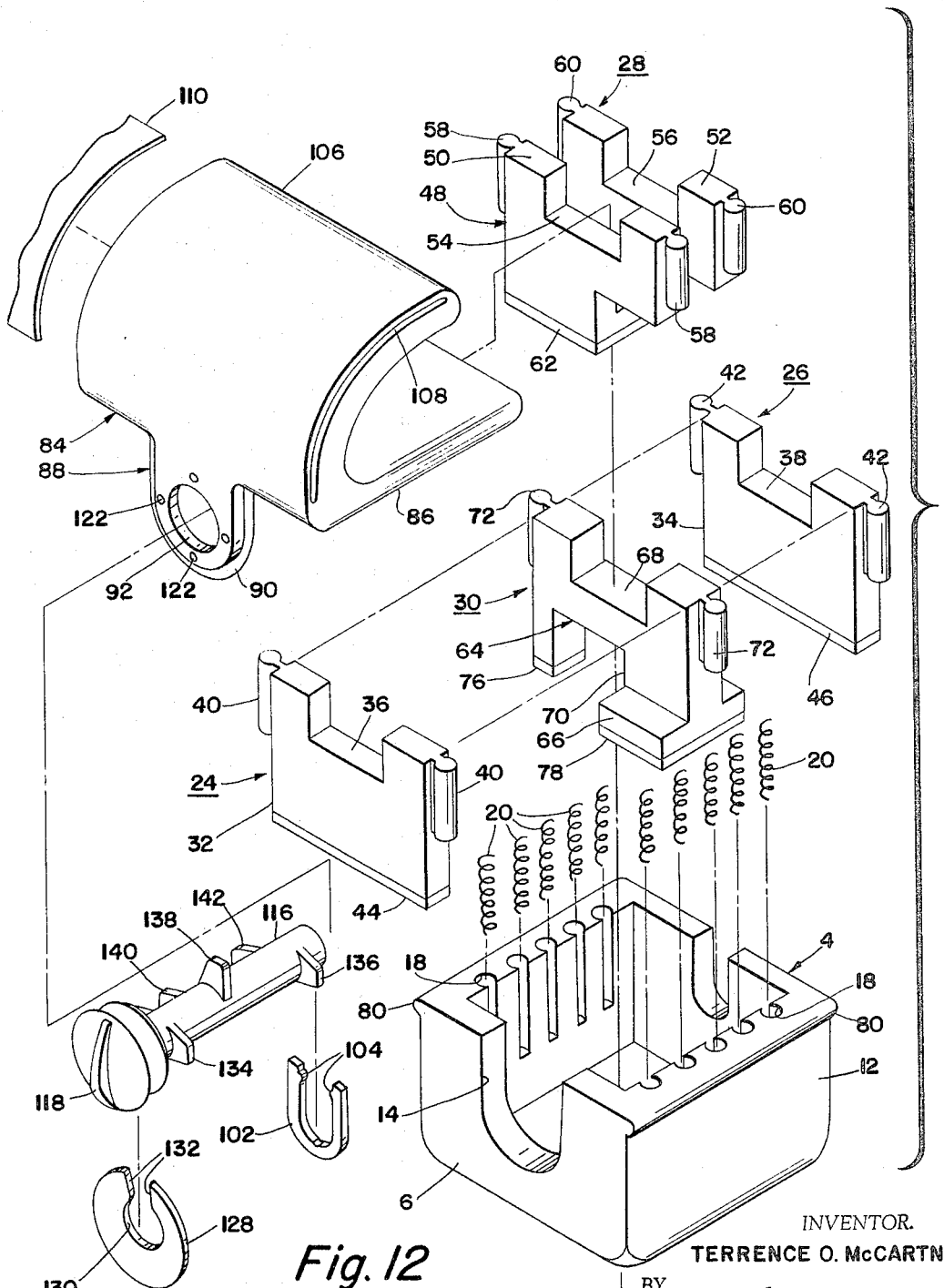
FIG. 12 is an exploded assembly view of the improved stamp device made in accordance with the present invention.

The disc 128 is preferably circular, in plan, and is generally of a concavo-convex configuration, in side elevation (FIG. 3) to provide optimum spring characteristics in the disc. As best shown in FIG. 12, the disc is provided with a central opening 130 which communicates with the exterior thereof by means of a divergently flared passageway 132 so that the disc may be readily inserted onto the shaft 112 for resilient interlocking coacting engagement intermediate the collar 124 and the inner face of the front hanger member 88 for resiliently retaining the shaft in its assembled position with the cover 84.

To actuate selective of the pressure blocks 24, 26, 28 and 30 of the printer assembly, the shaft 112 is provided with a plurality of axially spaced, radially disposed cam-like projections 134, 136, 138, 140 and 142. Moreover, and as best viewed in FIG. 12, the projections 134 and 136 extend laterally outwardly from the shaft 112 for coacting camming engagement on the axially aligned cam follower surfaces 36 and 38 of the outer pressure blocks 24 and 26 upon turning actuation of the dial 118. The centrally disposed projection 138 extends generally at right angles to the aforementioned projections 134, 136 and is adapted for coacting camming engagement on the cam follower surface 68 of the inner pressure block 30; while the other interior projections 140 and 142 extend laterally opposite to or at an angle of 180° relative to the aforementioned projections 134, 136 for coacting camming engagement on the pair of cam follower surfaces 54 and 56 of the other inner pressure block 28.

In use, the stamp device is assembled in accordance with the particular pattern or design sought to be duplicated. Moreover, and as best illustrated in the exploded view of FIG. 12, the coiled spring elements 20 are first inserted into the key-way cylinders 18 provided in the housing 4. The printer assembly 22 is then installed by inserting the outer pressure blocks 24 and 26 into the housing 4 adjacent the front 6 and rear 8 walls, respectively, with the associated key-way members 40 and 42 slidably registered within and resiliently seated upon associated of the aforementioned spring elements. The inner pressure block 30 is then engageably interlocked between the side members 50 and 52 of the other inner pressure block 28, after which the presure blocks 28 and 30 are inserted as a unit, into the remaining space between the outer pressure blocks 24 and 26 and with their associated key-way members 58, 60 and 72 slidably registered within and resiliently seated upon associated of the spring elements, as aforesaid. In this installed position of the printer assembly, the cam follower surfaces 36, 38, 54, 56 and 68 of the respective pressure blocks are in axial alignment with one another to provide a passageway (FIG. 4) for the reception therein of the shaft 112.

Thus installed, the appropriate legend card 110 may then be slid into the legend receiving slot 108 provided in the handle 106. The shaft 112 may then be assembled with the cover 84 by inserting the same through the bearing opening 92 in the front hanger member 88 so that the rear journal surface 116 thereof is disposed for rotation within the bearing opening 98 of the rear hanger member 96 and the journal sleeve 114 is disposed for rotation within the aforementioned front bearing opening 92. The retainer disc 128 may then be inserted around the shaft 112 so as to resiliently bear against the collar 124 and the inner face of the front hanger member 88, thereby to retain the shaft 112 in its assembled position with the cover 84. The cover mounting the shaft may then be assembled with the housing 4 by slidably registering the opposed kerfs 82 over the complementary longitudinally extending ribs 80 of the housing 4 until the front hanger flange 90 abuts against the housing. The resilient fastener clip 102 may then be inserted into the retainer groove 100 of the cover 84 and around the shaft 112 and into bearing engagement with the end wall 8 of the housing to retain the cover in assembled position with the housing.

In a typical application of this embodiment of the stamp device for duplicating a particular pattern or design which may incorporate any desired combination of colors as might appear on the legend card, the dial 118 is simply turned a quarter of a turn in a clockwise direction, as best viewed in FIG. 1, which rotates the shaft 112 to bring the cam-like projections 134 and 136 into camming engagement on the cam follower surfaces 36 and 38 of the outer pressure blocks 24 and 26. Such movement forces the outer pressure blocks 24 and 26 downwardly until the stamp elements 44 and 46 carried thereby, are disposed below the plane of the other associated stamp elements, whereupon a particular color of ink or the like may be applied thereto, such as by a conventional type ink pad, as known in the art. Once inked, the dial 118 may be turned in the same direction another quarter turn to bring the projection 138 into camming engagement on the cam follower surface 68 of the inner pressure block 30 which forces the same downwardly until the stamp elements 76 and 78 carried thereby, are disposed a predetermined distance below the plane of the other associated stamp elements for application thereto of another color ink. Simultaneously with such movement, the aforementioned projections 134 and 136 are rotated out of camming engagement with the cam follower surfaces 36 and 38 so that the resilient action of the associated spring elements 20 biases the outer pressure blocks 24 and 26 back up into the housing 4. The dial 118 may then be turned another quarter turn in the same direction so that the other interior cam elements 140 and 142 are brought into camming engagement on the cam follower surfaces 54 and 56 of the other inner pressure block 28 which forces the stamp element 62 carried thereby downwardly below the plane of the other stamp elements for application thereto of still another color ink. Moreover, upon such movement, the cam element 138 is rotated out of camming engagement with the cam follower surface 68 of the aforementioned inner pressure block 30, whereupon, the associated spring elements 18 bias the same upwardly back into the housing, as aforesaid. A final quarter turn of the dial 118 rotates the projections 140 and 142 out of engagement with the cam follower surfaces 54 and 56 so that the spring elements 20 associated therewith act to bias the pressure block 28 back upwardly into the housing 4, as aforesaid. In this final inked position, all of the pressure blocks 24, 26, 28 and 30 are resiliently maintained in biased engagement against the under surface 144 of the cover 84 (FIGS. 3 and 4) so that all of the associated stamped elements carried thereby are disposed substantially in a common plane below the under surface of the housing ready for duplicating the multi-colored pattern or design as might appear on the legend card.

Figure 13:
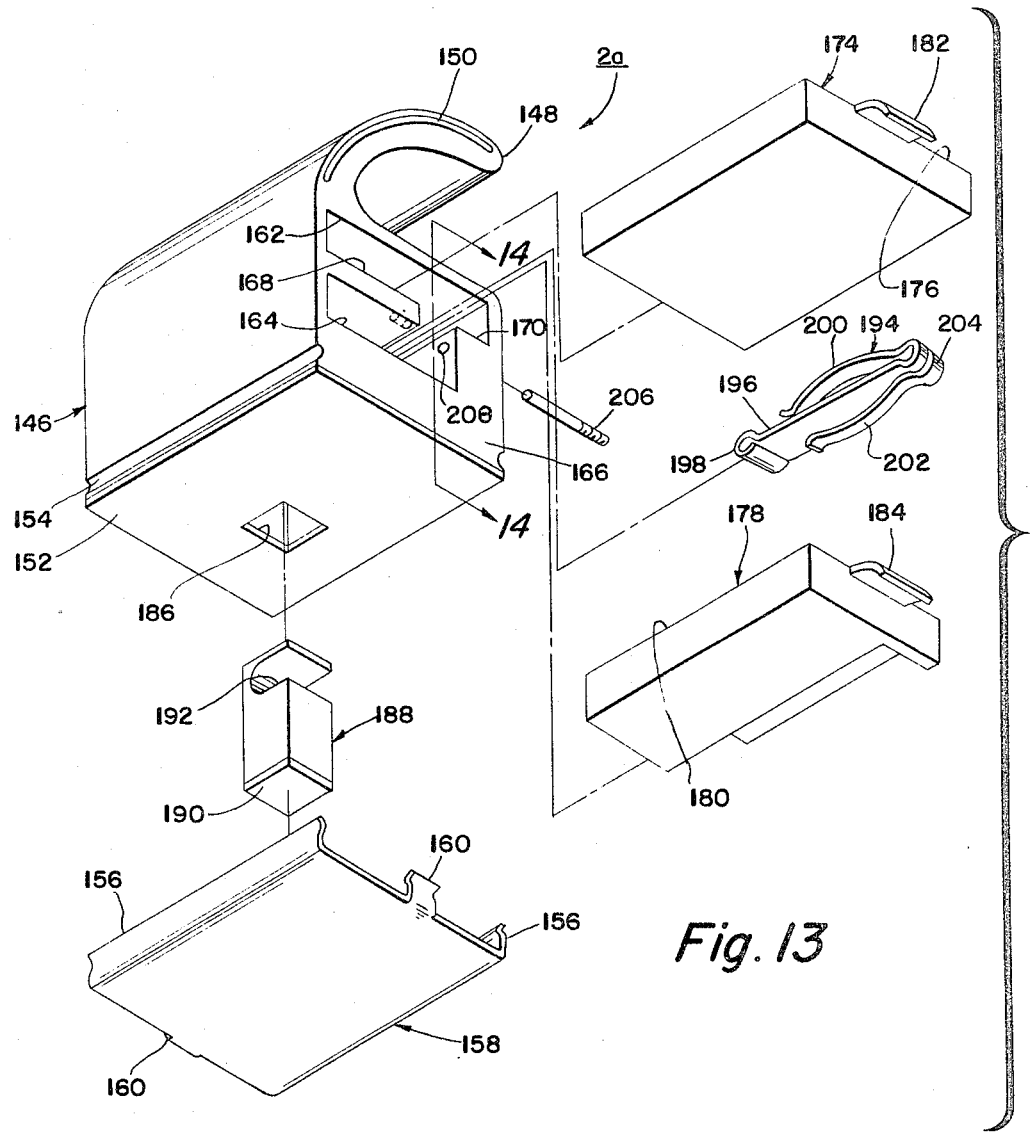
FIG. 13 is an exploded assembly view showing a modification of the improved stamp device made in accordance with the present invention.
Figure 14:
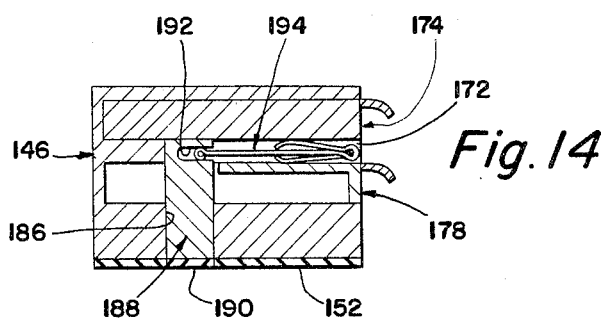
FIG. 14 is a vertical sectional view taken along the plane indicated by the line 14—14 of FIG. 13.

In the embodiment of FIGS. 13 and 14, there is illustrated a self-contained stamp device, designated generally at 2a, which includes a polygonal, such as rectangular, shaped housing 146, but wherein the handle 148 is made integral with rather than separate from the housing. The handle 148 projects upwardly at an angle of about 45° from the housing and includes the aforementioned type of transverse legend receiving slot 150 to provide a "full vision" of a legend card (not shown) which may be inserted therein, and for the purposes as aforementioned.

The housing 146 is preferably provided adjacent its bottom surface with a removable or integral stamp 152 element made of rubber, synthetic rubber or the like which incorporates a portion of the particular pattern or design desired to be duplicated. A pair of longitudinally extending kerfs 154 are provided adjacent the opposed marginal edges of the housing 146 to receive in snap-fastening relationship resilient flange portions 156 provided on a protective plate 158 which is adapted to be fitted onto the housing 146 to prevent soiling or damage to the associated stamp elements. The protective plate may be made of any suitable material, such as plastic, sheet metal or the like, and provided with bent resilient arms 160 adjacent the opposed ends thereof to further secure the same to the housing.

In the embodiment shown, the housing 146 is preferably provided with a pair of upper 162 and lower 164 generally polygonal, such as rectangular, cavities which open at one end onto one side 166 of the housing. The cavities 162 and 164 are separated from one another by means of a transverse partition 168 which is spaced laterally from an interior shoulder 170 to define an elongated slot 172 which communicates with each of the respective cavities and which also opens at one end onto one side 166 of the housing. The upper cavity 162 is preferably dimensioned so as to slidably receive therein a complementary upper drawer 174 which incorporates a conventional type ink pad surface 176, such as made of absorbent cloth or the like, for storing a particular color of ink thereon. The lower cavity 164 is similarly dimensioned to slidably receive therein a complemental lower drawer 178 having an ink pad surface 180 thereon for storing another color of ink thereon. The prospective drawers may be provided with suitable gripping handles 182 and 184 to facilitate insertion and removal of the drawers from assembled position within the association cavities.

The housing 146 is provided with a generally vertically extending passageway 186 which in the embodiment shown is preferably square in cross section. The passageway 186 opens at its upper end into the upper cavity 162 and at its lower end onto the under surface of the stamp element 152 for slidably receiving therein a complementally shaped pressure block 188. The pressure block is provided adjacent its lower end with another stamp element 190 having another particular pattern or design thereon which is sought to be duplicated and is provided adjacent its upper end with a transverse, generally U-shaped channel 192 which is adapted to receive one end of a resilient gate member 194 therein.

The gate member 194 is preferably formed from sheet metal having spring-like characteristics and includes an elongated base 196 which is bent over at one to provide a generally cylindrical eyelet 198 adapted to be inserted into the aforementioned channel 192 in the pressure block 188. The base 196 is bifurcated adjacent its other end to provide a pair of resilient, arcuate arms 200 and 202 which are bent over and extend in the general direction of the eyelet 198 on opposite sides of the base. Such forward bending of the resilient arms 200, 202 provides another cylindrical eyelet 204 adapted to receive therethrough an elongated keeper pin 206 which is adapted to be inserted through an aperture 208 provided in the wall of housing 146 for retaining the gate member 194 in assembled position.

In assembly of this embodiment, the drawer 174 storing the particular desired color ink may first be inserted into the corresponding upper cavity 162 of the housing 146. The pressure block 188 mounting the stamp element 190 of the particular desired pattern or design may be inserted upwardly through the passageway 186 and into abutment against the drawer 174, as best shown in FIG. 14. The gate member 194 may then be inserted into the slot 172 until the forward eyelet 198 is disposed in coacting engagement within the channel 192 provided in the pressure block 188. The keeper pin 206 may then be inserted through the aperture 208 in the housing 146 and into retaining engagement within the other eyelet 204 of the gate member 194. With the gate member 194 installed, the other drawer 178 storing another particular color ink may then be inserted into the lower cavity 164. In this assembled position, a corresponding legend card (not shown) may be inserted into the legend receiving slot 150 to provide a "full vision" of the particular design or pattern sought to be duplicated. For purposes of preventing soilage or damage to the stamp elements 152 and 190, the protective plate 158 may be snapped on to the housing 146 so that the stamp device may be conveniently stored until ready for usage.

In a typical application of this form of the stamp device, the protective cover plate 158 may simply be unsnapped from the housing 146 to expose the stamp elements 152 and 190 mounting the particular pattern or design. The drawer 174 may then be pulled out of the corresponding upper cavity 162 which automatically releases the spring tension provided by the upper resilient arm 200 of the gate member 194 which causes the lower resilient arm 202 to automatically pivot the gate member 194 about the keeper pin 206 to bias the pressure block 188 upwardly through the passageway 186 until the stamp element 190 carried thereon is disposed a predetermined distance above the general plane of the other stamp element 152. In this position, the stamp element 152 may then be inked with the particular color ink stored on the pad surface 176 of the drawer 174. The drawer 174 may then be re-inserted into the upper cavity 162 which automatically reverses the resilient spring action of the gate member 194 to lower the pressure block 188 and stamp element 190 carried thereby back down into the general plane of the other stamp element 152. The other drawer 178 may then be pulled from the lower cavity 164 which automatically releases the spring tension of the lower resilient arm 202 which causes the upper resilient arm 200 to pivot the gate member 194 in the opposite direction around the keeper pin 206 to bias the pressure block 188 downwardly so that the stamp element 190 carried thereby is forced down out of the general plane of the other stamp element 152. Hence, the last mentioned stamp element 152 may then be inked by any other particular color ink stored on the pad surface 180 of the drawer 178. The drawer 178 may then be re-inserted into the lower cavity 164 which automatically reverses the spring action of the gate member 194 to move the pressure block 188 and the stamp element 190 mounted thereon upwardly and back into the general plane of the other stamp element 152. In this final inked position, the stamp elements 152 and 190 are disposed in a common printing plane below the under surface of the housing 146 ready for duplicating in multi-color the pattern or design embodied thereon.

From the foregoing description and accompanying drawings, it can be seen that the present invention in general, provides an improved selectively adjustable printing surface for application of any number and/or arrangement of colors to a surface for multicolor reproduction. Though the devices in the embodiments shown have been illustrated as being of a hand implemented construction, it is contemplated that the printing surface itself and its principle of operation is readily designed for adaptation to either a hand or machine actuated type of printing or reproduction apparatus. It can be seen that such multi-color reproduction device is particularly useful in the reproduction of various printed and/or artistic indicia, such as shipping, mailing or postal designations, insignias, emblems, monograms, letterheads, caricatures and the like, thereby effectively eliminating the use of expensive stamps, labels, or decals and other such prefabricated type of indicia as known in the art.

I claim:

1. A stamp device for producing a composite, multi-color reproduction, such as intricate designs, patterns or the like, said device comprising a housing having oppositely disposed front and rear walls and oppositely disposed side walls connected together adjacent their corners to provide a polygonal cavity which extends through said housing, a cover detachably mounted over the open top of said housing, a printer assembly comprising a plurality of pressure members disposed for movement within the cavity in said housing, at least a pair of said pressure members being interconnected together for vertical movement relative to one another, the upper ends of said pair of said pressure members having cam surfaces disposed in axial alignment with one another and having bearing surfaces disposed in a common plane for engagement with the confronting under surface of said cover in the normal printing position of said members, the lower ends of said pair of said pressure members having printing surfaces extending from and disposed in a common plane below the open bottom of said housing in the normal printing position of said members with the printing surfaces of one of said members being disposed on the opposite sides of at least one printing surface of the other of said members to provide a composite, multi-color reproduction, resilient means mounted within said housing for yieldably supporting said pressure members within said cavity, a shaft rotatably journaled within said housing, said shaft having a plurality of axially spaced cam elements projecting radially therefrom for selective and independent camming coaction with the cam surfaces on said pressure members, whereby the printing surfaces of certain of said pressure members are moved downwardly out of said printing position into an inking position for application of one color ink and then back into said printing position; and the printing surfaces of the other of said pressure members are moved downwardly out of said printing position into an inking position for application of another color ink and then back into said printing position upon selective rotational indexing of said shaft.

2. A stamp devce in accordance with claim 1, wherein each of said pressure members includes a pair of oppositely disposed key-way members disposed for vertical movement within keyway slots provided in the opposed side walls of said housing, said resilient means including a coiled spring disposed within each of said key-way slots and yieldably supporting said key-way members therein.

3. A stamp device in accordance with claim 1, including an integral handle made from a transparent polymeric material projecting upwardly adjacent one end of said cover, said handle having an arcuate configuration in vertical cross-section and having a slot of generally the same arcuate contour extending transversely thereof so as to provide an uninterrupted surface for full vision of a legend adapted to be inserted within said slot.

4. A stamp device in accordance with claim 1, wherein said cover includes a depending front hanger portion adapted to be disposed adjacent the front wall of said housing and a depending rear hanger portion adapted to be disposed adjacent the rear wall of said housing, said hanger portions having oppositely disposed bores for journaling said shaft therein, said shaft having an integral knob adjacent one end and disposed exteriorly of said housing, said knob having a plurality of circumferentially spaced detent means adapted for engagement within a corresponding number of circumferentially spaced indent means provided on the confronting surface of said front hanger portion to provide selective rotational indexing of said shaft upon turning movement of said knob.

5. A stamp device in accordance with claim 4, wherein said shaft includes a collar disposed in spaced relation adjacent the front wall of said housing, and a resilient, generally U-shaped retainer means mounted on said shaft, said retainer means being arcuate in cross-section for resilient biasing engagement intermediate said collar and confronting surface of said front hanger portion in the assembled position thereof.

6. A stamp device for producing a composite multi-color reproduction, such as intricate patterns, designs or the like, said device comprising a housing having oppositely disposed front and rear walls and oppositely disposed side walls connected together adjacent their corners to provide a polygonal cavity which extends through said housing, the side walls each including a plurality of key-way slots disposed vertically therein, a resilient means disposed within each of said slots, a printer assembly comprising a plurality of pressure blocks disposed for movement within said cavity, one of said pressure blocks being disposed adjacent each of the front and rear walls of said housing and having cam surfaces adjacent their upper ends disposed in axial alignment with one another and printing surfaces adjacent their lower ends thereof projecting from and disposed in a common plane below the open bottom of said housing in the normal printing position thereof, at least one pair of pressure blocks being disposed between said first mentioned pressure blocks having cam surfaces disposed in axial alignment with one another adjacent their upper ends and printing surfaces adjacent their lower ends projecting from and disposed in the same general plane as said first mentioned pressure blocks in the normal printing position thereof, said pair of pressure blocks being interconnected together for vertical movement relative to one another with the printing surfaces of one of said pressure blocks being disposed on opposite sides of the printing surfaces of said other pressure block, each of said pressure blocks having a pair of oppositely disposed key-way members made integral therewith and projecting vertically therefrom for movement within the key-way slots provided in the side walls of said housing, a shaft journaled for rotation within said housing, said shaft having a plurality of axially spaced cam elements projecting radially therefrom for independent and selective camming engagement with the cam surfaces on said pressure blocks, a cover detachably mounted over the open top of said housing, and the upper ends of said pressure blocks having planar bearing surfaces disposed in the same general plane for engagement with the confronting under surface of said cover in the normal printing position of said blocks, whereby the printing surfaces of the pressure blocks disposed adjacent the front and rear walls of said housing are moved simultaneously downwardly from said printing position into an inking position for application of one color ink and then back into printing position; one of the pressure blocks of said pair is moved downwardly from said printing position into an inking position for application of another color ink and then back into printing position; and the other pressure block of said pair is moved downwardly from said printing position into an inking position for application of another color ink and then back into printing position upon selective rotational indexing of said shaft.

References Cited by the Examiner

UNITED STATES PATENTS

| | | | |
|---|---|---|---|
| 457,304 | 8/1891 | Cross | 101—109 |
| 506,586 | 10/1893 | Dunham | 101—109 |
| 704,302 | 7/1902 | Durand | 101—201 |
| 1,462,200 | 7/1923 | Gudgel et al. | 101—368 |
| 1,512,085 | 10/1924 | Clary | 101—201 |

DAVID KLEIN, *Primary Examiner.*

ROBERT E. PULFREY, *Examiner.*

NATHANIEL A. HUMPHRIES, WILLIAM F. McCARTHY, *Assistant Examiners.*